(12) United States Patent
Kurakane et al.

(10) Patent No.: US 10,731,322 B2
(45) Date of Patent: Aug. 4, 2020

(54) WORK MACHINE CONTROL SYSTEM AND WORK MACHINE CONTROL METHOD

(71) Applicant: Komatsu Ltd., Tokyo (JP)

(72) Inventors: Toru Kurakane, Tokyo (JP); Yuto Fujii, Tokyo (JP); Kota Beppu, Tokyo (JP); Yoshio Koda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 27 days.

(21) Appl. No.: 15/526,104

(22) PCT Filed: Jan. 13, 2017

(86) PCT No.: PCT/JP2017/001142
§ 371 (c)(1),
(2) Date: May 11, 2017

(87) PCT Pub. No.: WO2017/115879
PCT Pub. Date: Jul. 6, 2017

(65) Prior Publication Data
US 2018/0202128 A1 Jul. 19, 2018

(51) Int. Cl.
*E02F 9/20* (2006.01)
*E02F 9/26* (2006.01)
*E02F 3/84* (2006.01)
*G09B 29/00* (2006.01)

(52) U.S. Cl.
CPC ............ *E02F 9/2025* (2013.01); *E02F 3/847* (2013.01); *E02F 9/26* (2013.01); *E02F 9/261* (2013.01); *G09B 29/003* (2013.01)

(58) Field of Classification Search
CPC .......... E02F 9/2025; E02F 9/26; G09B 29/003
See application file for complete search history.

(56) References Cited

U.S. PATENT DOCUMENTS

| 8,351,684 B2 | 1/2013 | Clar et al. |
| 9,540,793 B2 | 1/2017 | Kami et al. |
| 9,556,594 B2 | 1/2017 | Shimano et al. |
| 2005/0027420 A1* | 2/2005 | Fujishima ............ E02F 9/2045 701/50 |
| 2005/0283294 A1* | 12/2005 | Lehman, Jr. ......... G05D 1/0236 701/50 |

(Continued)

FOREIGN PATENT DOCUMENTS

| CN | 101946250 A | 1/2011 |
| CN | 104619920 A | 5/2015 |

(Continued)

OTHER PUBLICATIONS

International Search Report and Written Opinion dated Apr. 11, 2017, issued for PCT/JP2017/001142.

*Primary Examiner* — Manuel A Rivera Vargas
*Assistant Examiner* — Yaritza H Perez Bermudez
(74) *Attorney, Agent, or Firm* — Locke Lord LLP

(57) ABSTRACT

A work machine control system includes: an acquisition unit configured to acquire a plurality of pieces of current topographical data indicating a current topography of a work site where a work machine performs work; and a combining unit configured to generate combined current topographical data of the work site in accordance with a predetermined rule based on the plurality of pieces of current topographical data acquired in the acquisition unit.

6 Claims, 10 Drawing Sheets

(56) References Cited

U.S. PATENT DOCUMENTS

| | | | |
|---|---|---|---|
| 2009/0202109 A1 | 8/2009 | Clar et al. | |
| 2013/0096886 A1* | 4/2013 | Vorobyov | G01C 11/00 |
| | | | 703/1 |
| 2013/0158785 A1* | 6/2013 | Fukano | E02F 9/261 |
| | | | 701/34.4 |
| 2014/0088838 A1* | 3/2014 | Furem | B65G 67/04 |
| | | | 701/50 |
| 2014/0100744 A1* | 4/2014 | Johnson | E02F 3/32 |
| | | | 701/50 |
| 2016/0024757 A1* | 1/2016 | Nomura | E02F 3/435 |
| | | | 414/687 |
| 2016/0027217 A1* | 1/2016 | da Veiga | G06F 3/011 |
| | | | 345/8 |
| 2016/0244950 A1 | 8/2016 | Kami et al. | |
| 2016/0258135 A1* | 9/2016 | Shimano | E02F 3/435 |
| 2016/0312446 A1* | 10/2016 | Pettersson | E02F 9/262 |
| 2016/0321763 A1* | 11/2016 | Shike | G06Q 10/06313 |
| 2016/0363454 A1* | 12/2016 | Hatanaka | G01C 21/34 |
| 2018/0137446 A1* | 5/2018 | Shike | E02D 17/18 |
| 2018/0355583 A1* | 12/2018 | Moriki | E02F 3/43 |

FOREIGN PATENT DOCUMENTS

| | | |
|---|---|---|
| CN | 105408554 A | 3/2016 |
| JP | 09-230039 A | 9/1997 |
| JP | 2006-235646 A | 9/2006 |
| JP | 2014-205955 A | 10/2014 |
| JP | 2017-004373 A | 1/2017 |
| WO | 2015/194601 A1 | 12/2015 |

\* cited by examiner

FIG.6
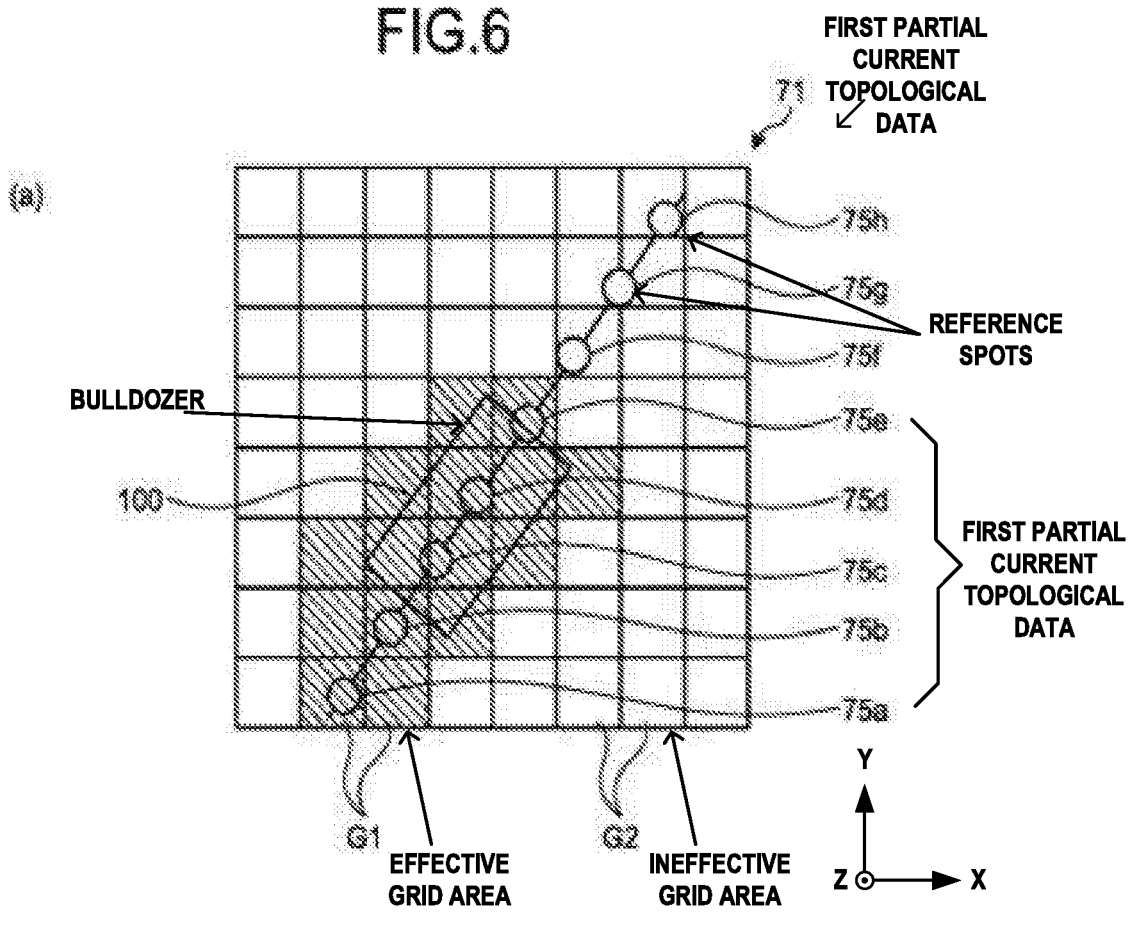
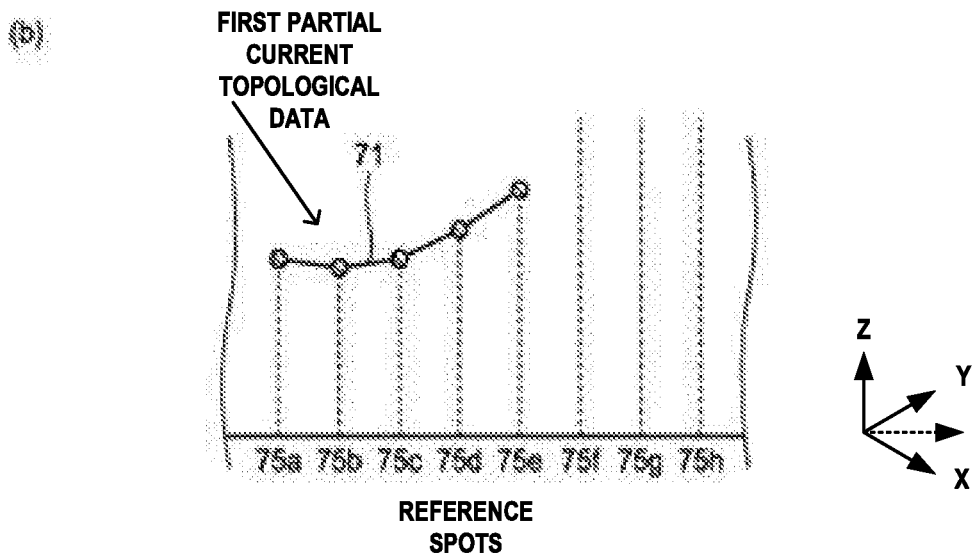

FIG.8
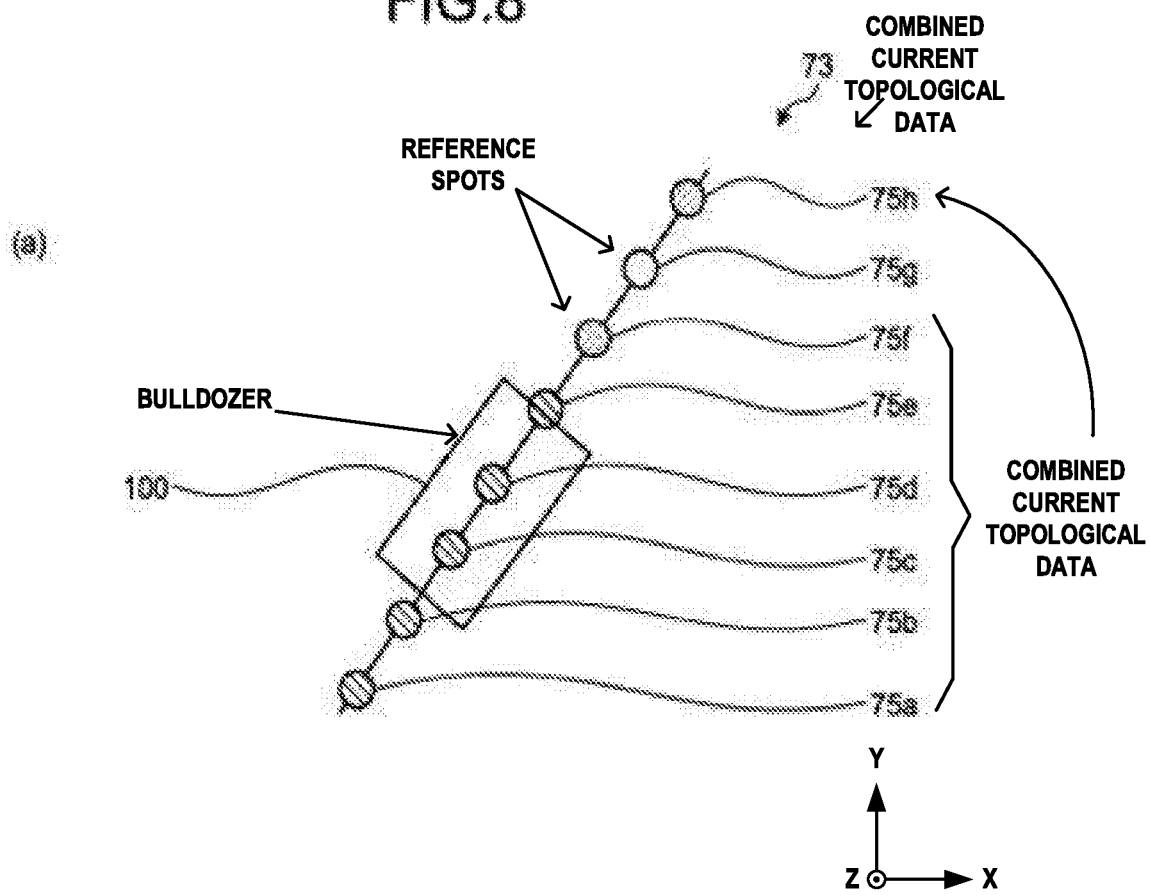
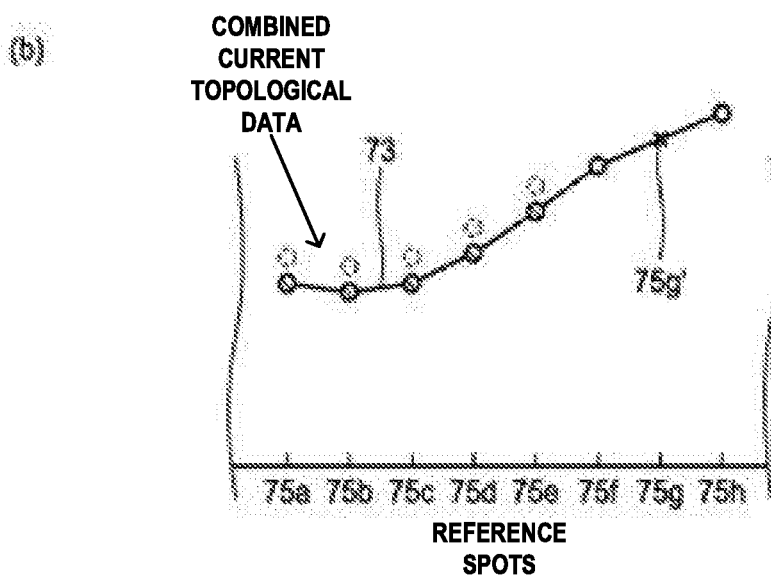

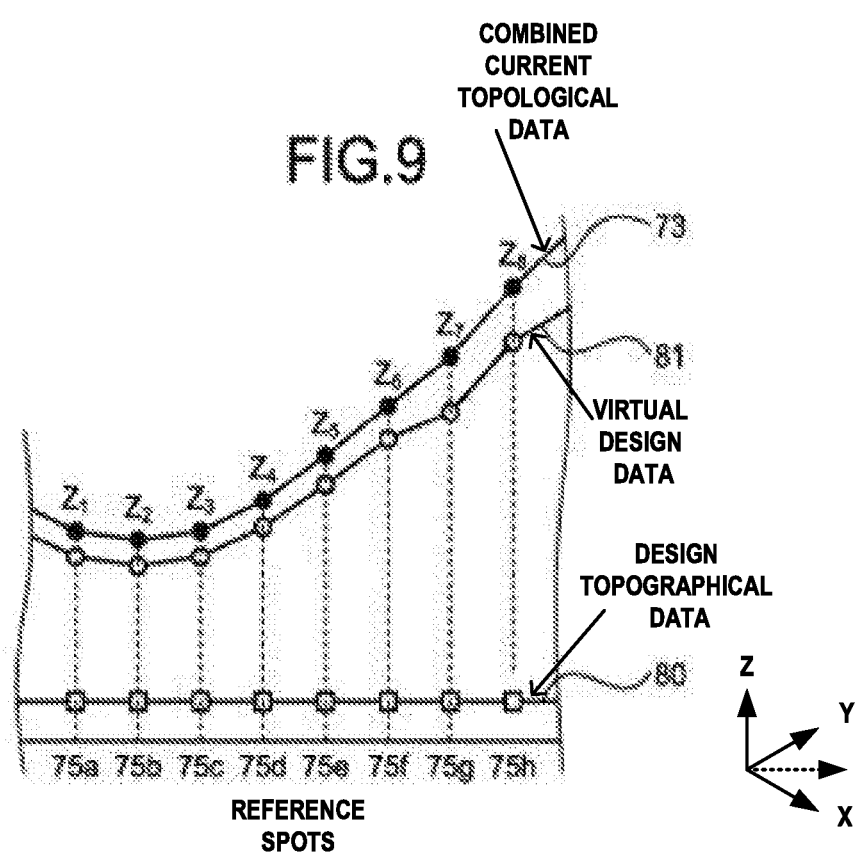

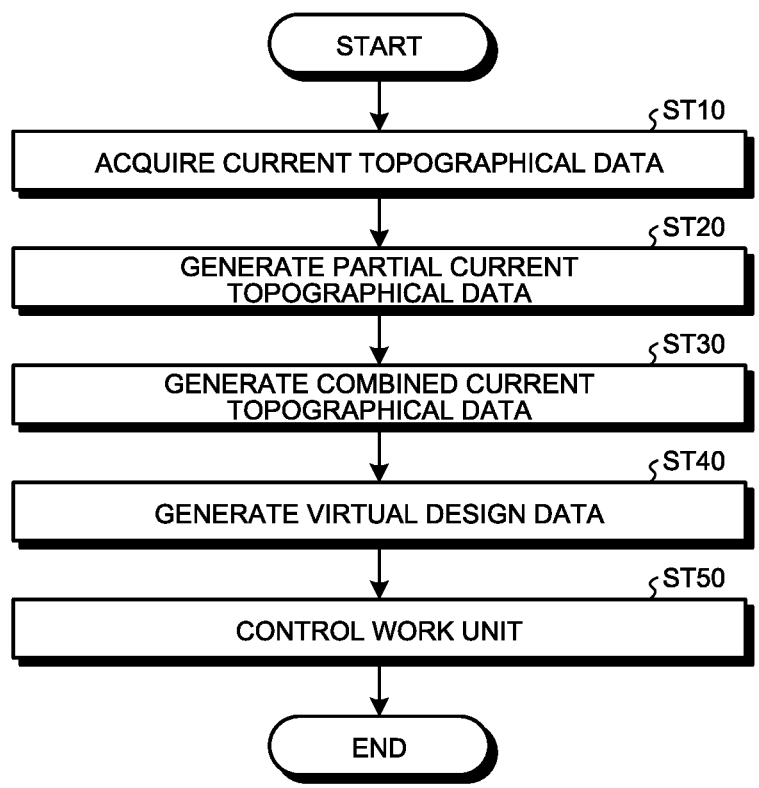

WORK MACHINE CONTROL SYSTEM AND WORK MACHINE CONTROL METHOD

FIELD

The present invention relates to a work machine control system and a work machine control method.

BACKGROUND

Recently, an information and communication technology (ICT) is increasingly applied in a work machine such as a bulldozer. For example, there is a work machine or the like mounted with a global navigation satellite systems (GLASS) and the like and adapted to: detect own position; compare such positional information with current topographical data indicating a current topography of a work site; and find a position, a posture, or the like of a work unit by performing arithmetic processing (refer to Patent Literature 1, for example). The current topographical data is managed by, for example, an external server and the like, and transmitted to the work machine from such a server. The work machine receives one kind of current topographical data transmitted from the server, and performs arithmetic processing and the like.

CITATION LIST

Patent Literature

Patent Literature 1: Japanese Laid-open Patent Publication No. 2014-205955

SUMMARY

Technical Problem

Recently, in such a work machine, it is requested to accurately perform automatic control for a work unit by using, for example, current topographical data. In this case, it may be difficult to accurately perform automatic control for a work unit depending on accuracy of current topographical data transmitted from a management device.

The present invention is made considering the above-described situation, and an object of the present invention is to provide a work machine control system and a work machine control method capable of accurately performing automatic control for a work unit by using highly-accurate current topographical data.

Solution to Problem

According to an aspect of the present invention, a work machine control system comprises: an acquisition unit configured to acquire a plurality of pieces of current topographical data indicating a current topography of a work site where a work machine performs work; and a combining unit configured to generate combined current topographical data of the work site in accordance with a predetermined rule based on the plurality of pieces of current topographical data acquired in the acquisition unit.

Advantageous Effects of Invention

According to the present invention, automatic control for a work unit can be accurately performed by using highly-accurate current topographical data.

BRIEF DESCRIPTION OF DRAWINGS

FIG. 6 is a diagram schematically illustrating processing to generate combined current topographical data.

FIG. 8 is a diagram illustrating exemplary combined current topographical data.

FIG. 9 is a diagram illustrating design topographical data, combined current topographical data, and virtual design data in a correlated manner.

FIG. 10 is a flowchart illustrating an exemplary work machine control method according to the present embodiment.

DESCRIPTION OF EMBODIMENTS

An embodiment of a work machine control system and a work machine control method according to the present invention will be described based on the drawings. Note that the present invention is not limited by the embodiment. Furthermore, note that components in the following embodiment include a component readily replaceable by a man skilled in the art or a component substantially identical thereto.

Figure 1:
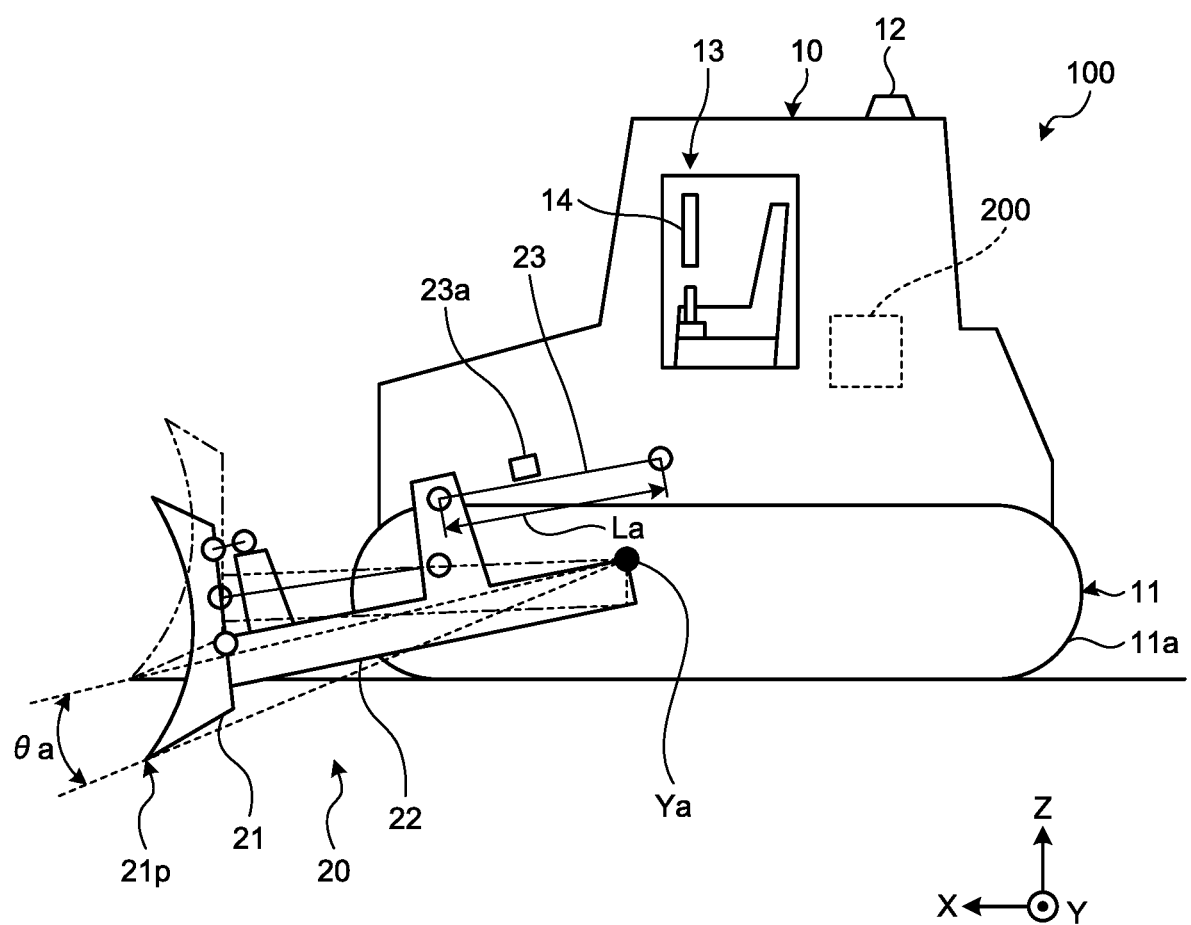
FIG. 1 is a view illustrating an exemplary work machine according to the present embodiment.

FIG. 1 is a view illustrating an exemplary work machine according to the present embodiment. In the present embodiment, a description will be provided by exemplifying a bulldozer 100 as a work machine. The bulldozer 100 includes a vehicle body 10 and a work unit 20. In the present embodiment, the bulldozer 100 is used in a construction site and a work site such as a mine, for example.

An X-axis, a Y-axis, a Z-axis illustrated in FIG. 1 represent an X-axis, a Y-axis, a Z-axis in a global coordinate system. In the present embodiment, a direction in which the work unit 20 is located relative to the vehicle body 10 is defined as a frontward direction. Therefore, a direction in which the vehicle body 10 is located relative to the work unit 20 is defined as a backward direction. In the present embodiment, a direction in which the vehicle body 10 is located relative to a ground contact surface where a crawler 11a contacts the ground is defined as an upward direction, and a direction directed from the vehicle body 10 to the ground contact surface, in other words, a gravity direction is defined as a downward direction. Note that, in FIG. 1, the bulldozer 100 is disposed in a state in which a front-back direction is made to coincide with the X-direction, a vehicle width direction is made to coincide with the Y-direction, and a vertical direction is made coincide with the Z-direction.

The vehicle body 10 includes a travel device 11 as a travel unit. The travel device 11 includes the crawler 11a. The crawler 11a is disposed on each of right and left sides of the vehicle body 10. The travel device 11 makes the bulldozer 100 travel by rotating the crawler 11a by a hydraulic motor not illustrated.

The vehicle body 10 includes an antenna 12. The antenna 12 is used to detect a current position of the bulldozer 100.

The antenna 12 is electrically connected to a global coordinate arithmetic device 15. The global coordinate arithmetic device 15 is a position detector adapted to detect a position of the bulldozer 100. The global coordinate arithmetic device 15 detects the current position of the bulldozer 100 by utilizing global navigation satellite systems (GNSS represents global navigation satellite systems). In the following description, the antenna 12 will be suitably referred to as a GNSS antenna 12. A signal in accordance with GNSS radio waves received by the GNSS antenna 12 is received in the global coordinate arithmetic device 15. The global coordinate arithmetic device 15 finds a setting position of the GNSS antenna 12 in the global coordinate system (X, Y, Z) illustrated in FIG. 1. A global positioning system (GPS) can be exemplified as an example of the global navigation satellite system, but the global navigation satellite system is not limited thereto. It is preferable that the GNSS antenna 12 be set at an upper end of an operation room 13, for example. Note that two GNSS antennas 12 may also be disposed, for example. In this case, orientation data can be generated by using data obtained from the two GNSS antennas 12.

The vehicle body 10 includes the operation room 13 provided with an operation seat to be seated by an operator. In the operation room 13, various kinds of operating devices and a display unit 14 to display image data are disposed. The display unit 14 is, for example, a liquid crystal device or the like, but not limited thereto. For the display unit 14, a touch panel integrating an input unit with a display unit can be used, for example. Additionally, an operating device not illustrated is provided in the operation room 13. The operating device is a device to operate at least one of the work unit 20 and the travel device 11.

The work unit 20 includes a blade 21 that is a working tool, a lift frame 22 to support the blade 21, and a lift cylinder 23 to drive the lift frame. The blade 21 includes a blade edge 21p. The blade edge 21p is disposed at a lower end portion of the blade 21. The blade edge 21p contacts the ground during work such as land grading work or excavation work. The blade 21 is supported by the vehicle body 10 via the lift frame 22. The lift cylinder 23 connects the vehicle body 10 to the lift frame 22. The lift cylinder 23 drives the lift frame 22 and vertically moves the blade 21. The work unit 20 includes a lift cylinder sensor 23a. The lift cylinder sensor 23a detects lift cylinder length data La representing a stoke length of the lift cylinder 23.

Figure 2:
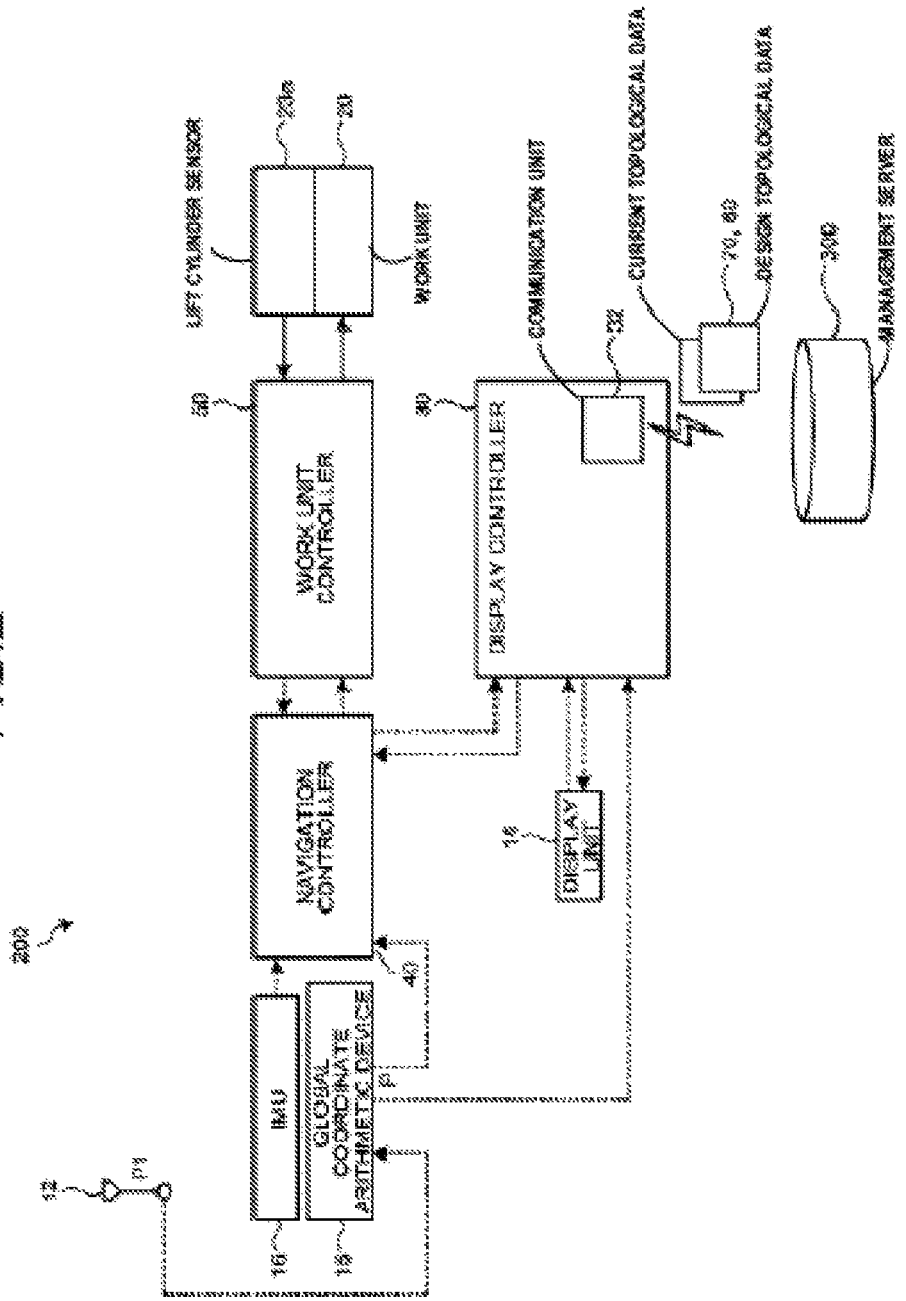
FIG. 2 is a block diagram illustrating an exemplary control system that is a work machine control system according to the present embodiment.

FIG. 2 is a block diagram illustrating an exemplary control system 200 that is a work machine control system according to the present embodiment. As illustrated in FIG. 2, the control system 200 includes: the global coordinate arithmetic device 15; an inertial measurement unit (IMU) 16 that is a state detector to detect an angular speed and an acceleration speed; a navigation controller 40; a display controller 30; and a work unit controller (work unit control unit) 50.

The global coordinate arithmetic device 15 acquires reference positional data P1 that is positional data of the antenna 12 indicated by the global coordinate system. The global coordinate arithmetic device 15 includes: a processing unit that is a processor such as a central processing unit (CPU); and a storage unit that is a storage device such as a random access memory (RAM) and a read only memory (ROM).

The global coordinate arithmetic device 15 generates positional data P indicating a position of the vehicle body 10 based on the reference positional data P1. The positional data P indicates a position in the global coordinate system (X, Y, Z). The global coordinate arithmetic device 15 outputs the generated positional data P to the navigation controller 40 and the display controller 30.

The IMU 16 is the state detector to detect operational information of the bulldozer 100. In the embodiment, the operational information may include information indicating a posture of the bulldozer 100. Exemplary information indicating the posture of the bulldozer 100 may include a roll angle, a pitch angle, and an orientation angle of the bulldozer 100. The IMU 16 is mounted on the vehicle body 10. The IMU 16 may be installed at a lower portion of the operation room 13, for example.

The IMU 16 detects an angular speed and an acceleration speed of the bulldozer 100. With operation of the bulldozer 100, various kinds of acceleration speeds such as an acceleration speed generated during travel, an angular acceleration speed during swing, and a gravitational acceleration speed are generated in the bulldozer 100, and the IMU 16 detects and outputs at least the gravitational acceleration speed. Here the gravitational acceleration speed is an acceleration speed corresponding to resistance against gravity. The IMU 16 detects, for example, acceleration speeds in the X-axis direction, Y-axis direction, and Z-axis direction and angular speeds (rotation angular speeds) around the X-axis, Y-axis, and Z-axis in the global coordinate system (X, Y, Z).

The display controller 30 displays an image such as a guidance screen on the display unit 14. The display controller 30 includes a communication unit 32. The communication unit 32 can communicate with an external communication apparatus. The communication unit 32 receives, for example, current topographical data 70 and design topographical data 80 of a work site from a management server 300 and the like. The communication unit 32 may also receive the current topographical data 70 and the design topographical data 80 of the work site from an external storage device such as a USE memory, a PC, a portable terminal, and so on.

The navigation controller 40 includes: a processing unit that is a processor such as a CPU; and a storage unit that is a storage device such as a RAM and a ROM. The navigation controller 40 receives a detection value of the global coordinate arithmetic device 15, a detection value of the IMU 16, and an output value from the work unit controller 50 described later. The navigation controller 40 finds positional information related to a position of the bulldozer 100 from the detection value of the global coordinate arithmetic device 15 and the detection value of the IMU 16, and outputs the same to the display controller 30. The navigation controller 40 receives virtual design data 81 output from the display controller 30. The navigation controller 40 sets a target blade edge position of the blade edge 21p of the blade 21 based on the virtual design data 81, and outputs the same to the work unit controller 50.

The navigation controller 40 receives blade edge positional data from the work unit controller 50. The blade edge positional data is data indicating a blade edge position that is a three-dimensional position of the blade edge 21p. The navigation controller 40 generates target blade edge positional data indicating a target blade edge position based on the blade edge positional data. The navigation controller 40 uses current topographical data indicating a current topography of a work site at the time of generating the target blade edge positional data. The navigation controller 40 generates, for example, a virtual target ground surface on which the current topography indicated by the current topographical data is offset downward by a predetermined distance, and generates the target blade edge positional data such that the blade edge 21p conforms to the virtual target ground surface.

The work unit controller 50 includes: a processing unit that is a processor such as a CPU; and a storage unit that is a storage device such as a RAM and a ROM. The work unit controller 50 detects the blade edge positional data by using positional information of the blade 21. The work unit controller 50 receives a target blade edge position output from the navigation controller 40. The work unit controller 50 generates and outputs a work unit command value adapted to control operation of the work unit 20 based on the target blade edge positional data. Furthermore, the work unit controller 50 receives lift cylinder length data La output from the lift cylinder sensor 23a. The work unit controller 50 calculates a lift angle θa of the blade 21 based on the lift cylinder length data La (refer to FIG. 1). The lift angle θa corresponds to a downward angle from an original position of the blade 21, that is, an intrusive depth of the blade edge 21p into the ground or a height of the same from the ground. In FIG. 1, the original positions of the lift frame 22 and the blade 21 are indicated by two-dot chain lines. In the case where the lift frame 22 and the blade 21 are positioned at the original positions, the blade edge 21p of the blade 21 contacts the ground. Land grading work and excavation work by the bulldozer 100 are performed when the bulldozer 100 travels forward in a state in which the blade 21 is set downward from the original position. The work unit controller 50 outputs, to the navigation controller 40, a signal indicating the blade edge position related to a current position of the blade edge 21p and the lift angle θa based on a detection value of the lift cylinder sensor 23a.

Figure 3:
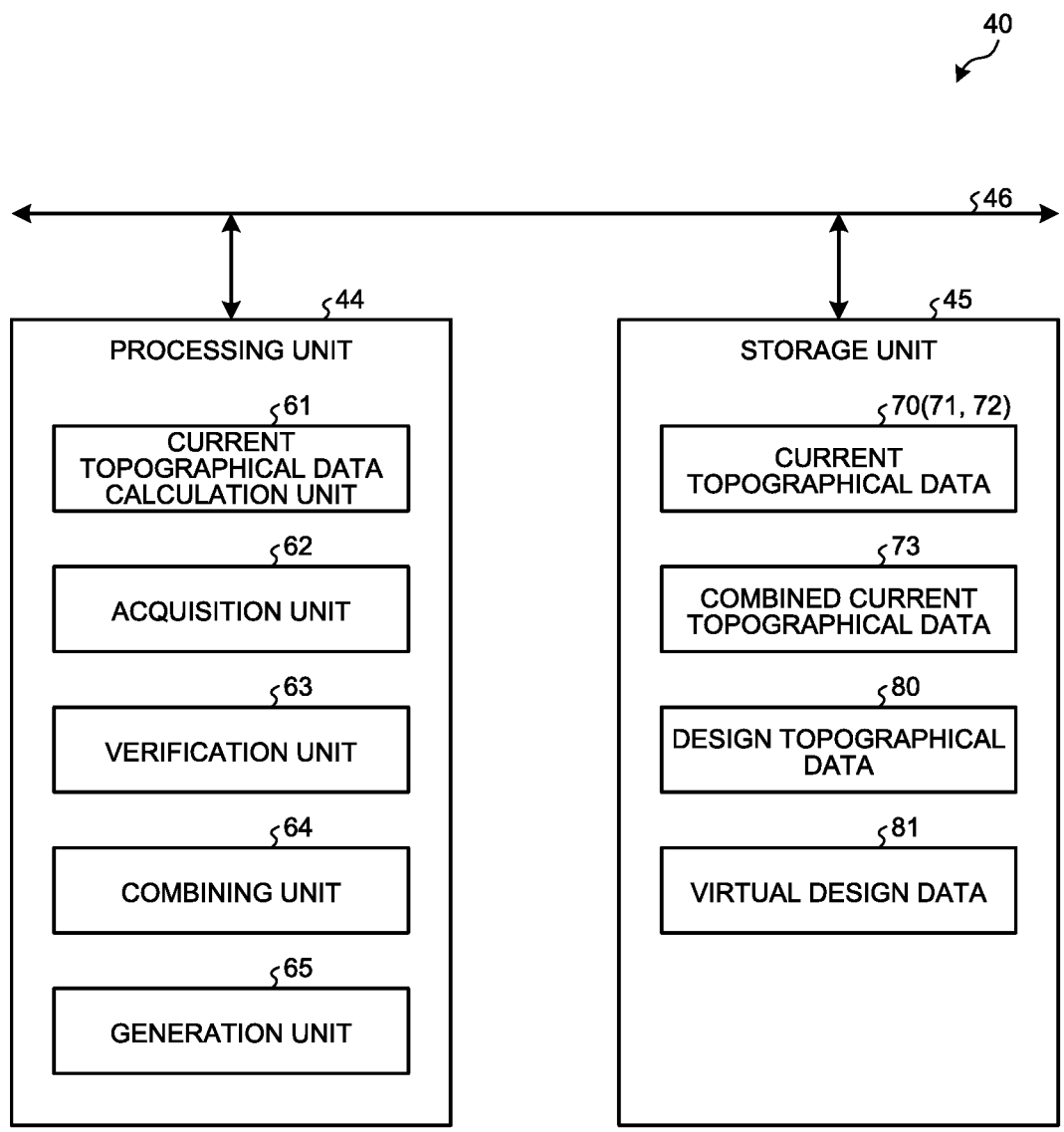
FIG. 3 is a block diagram illustrating an exemplary display controller.

FIG. 3 is a block diagram illustrating an exemplary navigation controller 40. As illustrated in FIG. 3, the navigation controller 40 includes a processing unit 44 and a storage unit 45. The navigation controller 40 has the processing unit 44 and the storage unit 45 connected via a signal property such as a bus line 46. Furthermore, the storage unit 45 stores programs, data, and the like in order to execute various kinds of processing in the processing unit 44. The storage unit 45 stores, for example, the later-described current topographical data 70, the design topographical data 80, and the combined current topographical data 73.

Figure 4:
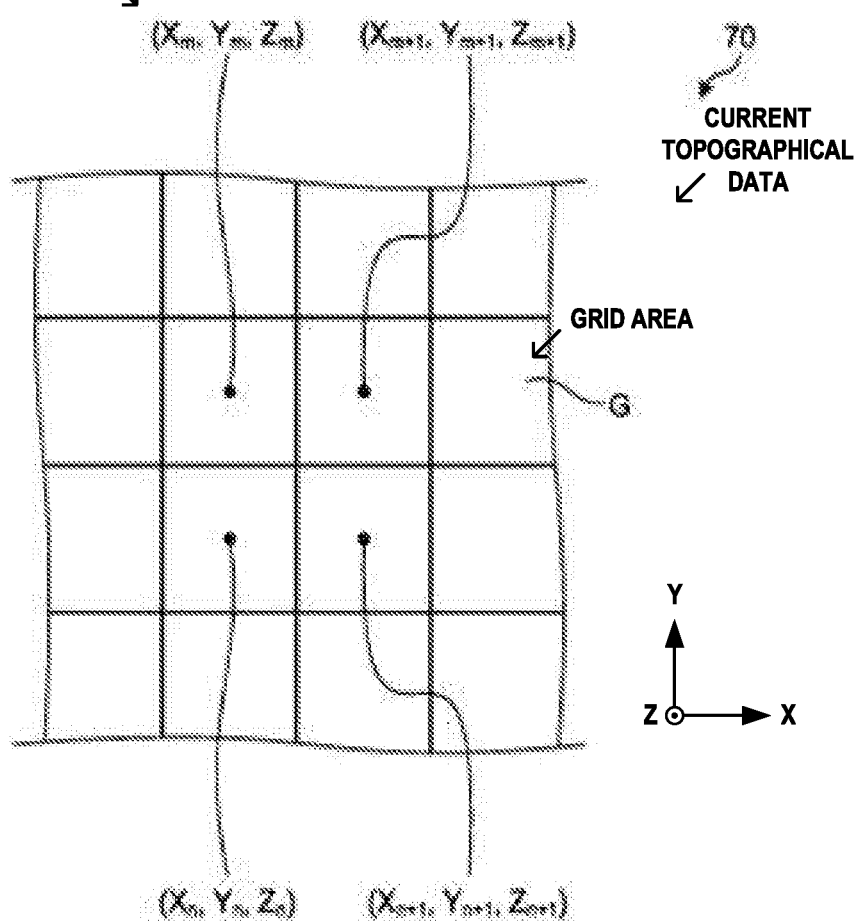
FIG. 4 is a diagram illustrating exemplary current topographical data.

FIG. 4 is a diagram illustrating exemplary current topographical data. As illustrated in FIG. 4, the current topographical data 70 is data related to a height position (Z-coordinate) in each grid area G in the case of sectioning a work site into a plurality of grid areas G. The grid areas G are provided at predetermined intervals in the X-direction and the Y-direction of the global coordinate system. In each grid area G, positional data (X, Y, Z) of the global coordinate system is accumulated. Meanwhile, the current topographical data 70 is only needed to be the data related to height data of any position in a grid area G, and for example, may be height data at a center position of a grid area G or may also be height data at four corners of a grid area G. The grid area G is set to have a square shape, for example, but not limited thereto, and may have other shapes such as a rectangle, a parallelogram, and a triangle.

In the present embodiment, the current topographical data 70 is generated by, for example, measuring a current topography of a work site by using various kinds of measuring methods. The current topographical data 70 includes, for example, multiple kinds of current topographical data obtained by different measuring methods. Exemplary measuring methods adapted to generate the current topographical data 70 may include: a method of measuring a current topography by using positional information of a vehicle which travels in a work site; a method of measuring a current topography by using positional information of a work machine such as the bulldozer 100 which travels in a work site, a method of surveying a current topography by making a surveying vehicle travel; a method of surveying a current topography by using a stationary surveying instrument; a method of measuring a current topography by a stereo camera; and a method of measuring a current topography by an unmanned air vehicle such as a drone. Meanwhile, measurement by a drone and the like may be a method in which a current topography is photographed by using, for example, a camera and the like and current topographical data is measured based on this photographing result, or the current topographical data may be measured by using a laser scanner. Identifying information may also be assigned to the current topographical data 70 in order to identify a measuring method and the like.

The processing unit 44 is a processor such as a CPU. The processing unit 44 includes an acquisition unit 62, a verification unit 63, a combining unit 64, a generation unit 65, a display control unit 66, and a current topographical data calculation unit 61.

The current topographical data calculation unit 61 calculates the current topographical data 70 indicating a current topography for a region of the work site where, for example, the bulldozer 100 has passed. The current topographical data calculation unit 61 calculates the current topographical data 70 based on, for example, positional information output from the global coordinate arithmetic device 15. In this case, the current topographical data calculation unit 61 calculates, for example, a Z-coordinate in each of grid areas G corresponding to the region where the bulldozer 100 has passed.

The acquisition unit 62 acquires a plurality of pieces of the current topographical data 70 indicating a current topography of the work site. The current topographical data 70 acquired by the acquisition unit 62 includes, for example, the current topographical data 70 received from the management server 300 and the current topographical data 70 generated in the current topographical data calculation unit 61.

Accuracy, a range including data, and the like of the plurality of pieces of the current topographical data 70 acquired by the acquisition unit 62 may be varied by a measuring method and the like. For example, the current topographical data 70 acquired by performing measurement by using positional information of a vehicle in the work site has low measurement accuracy because a travel speed during the measurement is fast. On the other hand, the number of grid areas G including data can be increased by measuring the current topographical data 70 by making the vehicle travel across a wide region of the work site.

Additionally, the current topographical data 70 acquired by using positional information of a work machine such as the bulldozer 100 having a travel speed slower than the above vehicle has high measurement accuracy because of the slow travel speed. On the other hand, since the bulldozer 100 mainly travels, for example, at places of the work site in order that the bulldozer 100 may perform work and move for the work, the number of grid areas G including data is limited.

The verification unit 63 verifies the current topographical data 70 acquired by the acquisition unit 62. The verification unit 63 performs verification based on at least one of an acquisition time of the current topographical data 70 and accuracy of the current topographical data 70. As a result of verification, the verification unit 63 adopts the current topographical data 70 satisfying a predetermined standard and discards the current topographical data 70 not satisfying the predetermined standard. Meanwhile, the verification unit 63 is not necessarily provided.

The combining unit 64 generates the combined current topographical data 73. The combined current topographical data 73 is current topographical data indicating a current topography at a predetermined reference spot of the work site.

Figure 5:
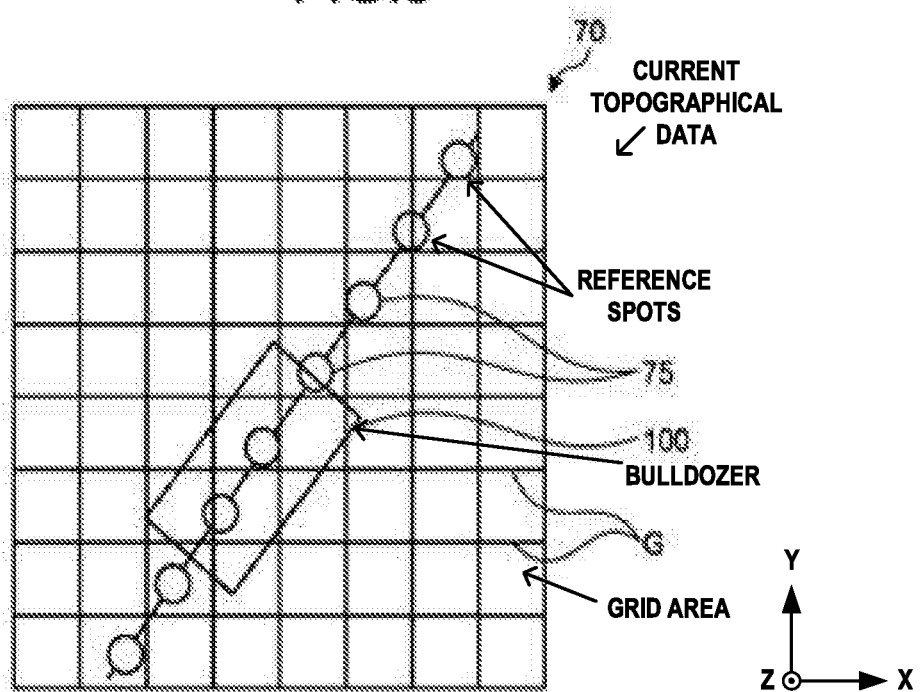
FIG. 5 is a diagram illustrating exemplary reference spots.

FIG. 5 is a diagram illustrating exemplary reference spots. In FIG. 5 schematically illustrates the bulldozer 100 by a rectangular shape. As illustrated in FIG. 5, reference spots 75 are located at a plurality of spots in a manner conforming to a travel direction of the travel device 11 of the bulldozer 100. Each of the reference spots 75 is set in a straight line direction on the front and back sides of the travel direction while setting a current position of the bulldozer 100 as a base point. The number of setting points of the respective reference spots 75 and an interval between the reference spots 75 are optional. Therefore, for example, the respective reference spots 75 may be set at equal intervals as illustrated in FIG. 5. Furthermore, the number of setting points of the reference spots 75 may be equal or different on the front and back sides relative to the current position. The plurality of reference spots 75 is set based on positional information output from the global coordinate arithmetic device 15. Meanwhile, the reference spot 75 is not limited to the above and may be set in any position. Additionally, an X-coordinate and Y-coordinate at each reference spot 75 are found based on positional information of the bulldozer 100 and orientation information of the bulldozer 100.

Here, exemplary processing to generate the combined current topographical data 73 by the combining unit 64 will be described. In the case of generating the combined current topographical data 73, the combining unit 64 generates one piece of the combined current topographical data 73 by combining positional data at positions conforming to or same as a plurality of pieces of the current topographical data 70 in accordance with a predetermined rule. As an example of the present embodiment, a case of generating the combined current topographical data 73 by using the following reference spots 75 will be described. First, the combining unit 64 finds height data (Z-coordinate) at the reference spot 75 based on positional data (X, Y, Z) in each grid area G in one piece of the current topographical data 70 and positional data (X, Y) in the X-direction and Y-direction at the reference spot 75. In this case, the combining unit 64 calculates the Z-coordinate by, for example, linear interpolation based on coordinates (X, Y, Z) in grid areas G (e.g., four coordinates) located around the reference spot 75 regarding the reference spot 75 for which the Z-coordinate is to be found. Such processing is performed for each reference spot 75, and a set of Z-coordinates of the respective reference spots 75 (hereinafter referred to as partial current topographical data) is calculated. Meanwhile, in the present embodiment, the partial current topographical data is an example of current topographical data.

Figure 7:
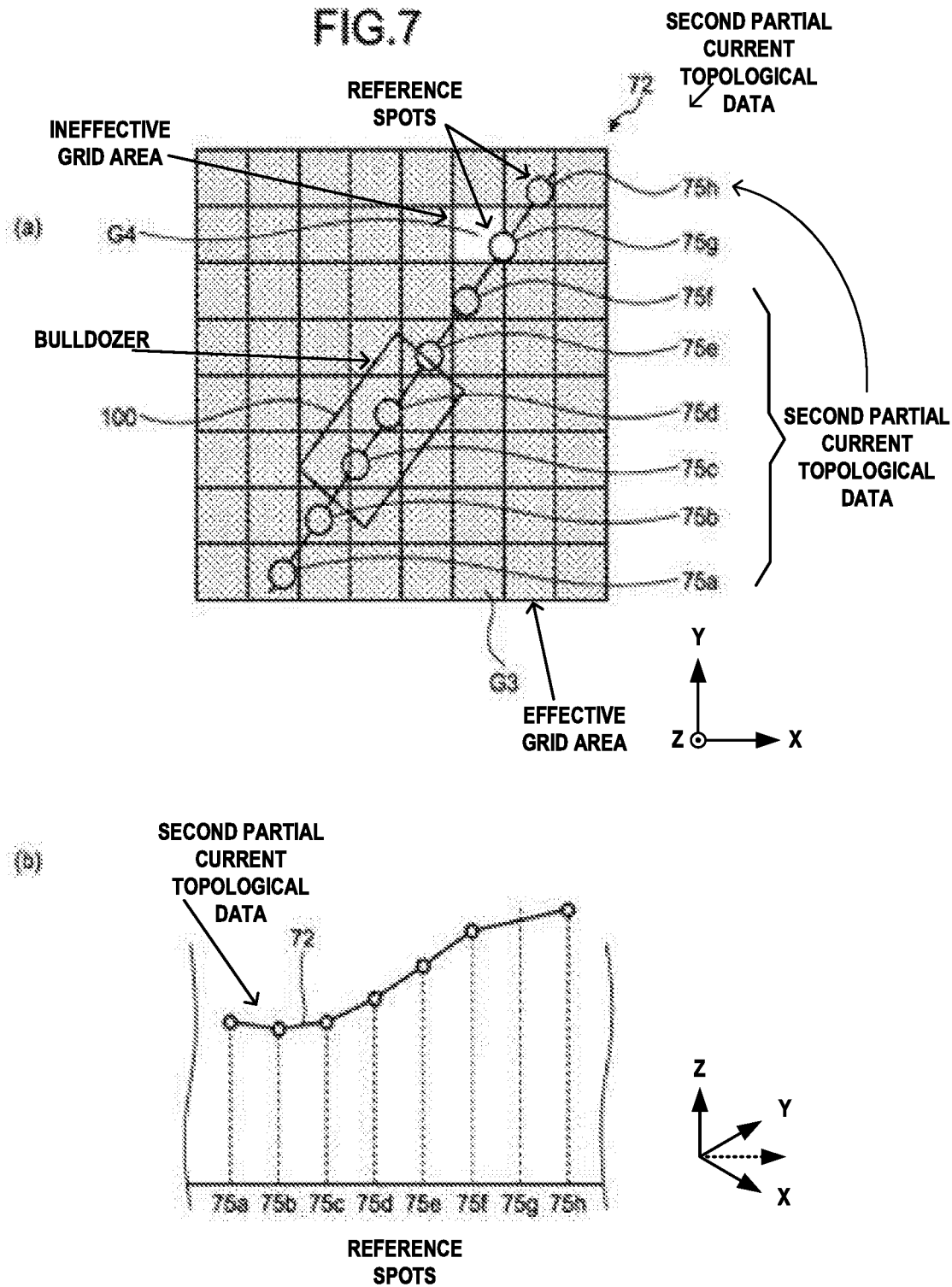
FIG. 7 is a diagram schematically illustrating processing to generate combined current topographical data.

FIGS. 6 and 7 are diagrams schematically illustrating the processing to calculate a Z-coordinate for each reference spot 75. First, a description is provided for a case where the combining unit 64 sets, as the first current topographical data 71, the current topographical data 70 obtained by measuring a current topography by using, for example, positional information of a work machine such as the bulldozer 100 from among multiple kinds of current topographical data 70. In this case, the first current topographical data includes positional data calculated for a grid area G where the bulldozer 100 has traveled, but does not include positional data for a grid area G where the bulldozer 100 has not traveled. A grid area G including positional data is defined as an effective grid area G1 and a grid area G not including positional data is defined as an ineffective grid area G2. In FIG. 6(a), a grid area G where the bulldozer 100 has passed is set as an effective grid area G1, and a grid area G where the bulldozer 100 has not passed is set as an ineffective grid area G2. The combining unit 64 calculates a Z-coordinate at each reference spot 75 in a range in which calculation can be performed by using positional information in the effective grid area G1. As illustrated in FIG. 6(a), the combining unit 64 calculates Z-coordinates for reference spots 75 (75a, 75b, 75c, 75d, 75e) located in the vicinity of the effective grid areas G1 by using positional data of the effective grid areas G1. Additionally, the combining unit 64 does not calculate any Z-coordinate for reference spots 75 (75f, 75g, 57h) including no positional data and located in the vicinity of the ineffective grid areas G2 in FIG. 6(a). As a result, the combining unit 64 generates a set of positional information at the reference spots 75a, 75b, 75c, 75d, 75e as first partial current topographical data 71.

FIG. 6(b) illustrates Z-coordinates at the respective reference spots 75 in the first partial current topographical data 71. The reference spots 75a, 75b, 75c, 75d, 75e for which the Z-coordinates have been found include height data, but the reference spots 75f, 75g, 57h for which no Z-coordinate has been found do not include any height data.

Next, a description is provided for a case where the combining unit 64 sets, as the second current topographical data, the current topographical data 70 obtained by measuring a current topography by using, for example, positional information of a vehicle from among multiple kinds of the current topographical data 70. FIG. 7(a) illustrates an example where part of data is discarded by the verification unit 63, for example. As illustrated in FIG. 7(a), the combining unit 64 treats an ineffective grid area G4 as an ineffective grid area G including no data. Therefore, in the case illustrated in FIG. 7(a), the combining unit 64 calculates Z-coordinates at reference spots 75 in a range where calculation can be performed by using positional information in the vicinity of effective grid areas G3. As illustrated in FIG. 7(a), the combining unit 64 calculates Z-coordinates at reference spots 75 (75a, 75b, 75c, 75d, 75e, 75f, 57h) located in the vicinity of the effective grid areas G3 by using positional data of the effective grid areas G3. Additionally, the combining unit 64 does not calculate a Z-coordinate for a reference spot 75g located in the vicinity of the ineffective grid area G4. As a result, the combining unit 64 generates a set of positional information at the reference spots 75a, 75b, 75c, 75d, 75e, 75f, 57h as second partial current topographical data 72.

FIG. 7(b) illustrates Z-coordinates in the respective reference spots 75 in the second partial current topographical data 72. The reference spots 75a, 75b, 75c, 75d, 75e, 75f, 57h for which the Z-coordinates have been found include height data, but the reference spot 75g for which no Z-coordinate has been found does not include any height data.

Meanwhile, in the above-described example, the reference spot 75g does not include any Z-coordinate in both of the first partial current topographical data 71 and the second partial current topographical data 72. In such a case, the combining unit 64 may complement positional information of the ineffective grid area G4 by a method such as a linear interpolation based on positional information of the effective grid areas G3 arranged around the above-described ineffective grid area G4. Then, in the case where the ineffective grid area G4 is made to an effective grid area G3, the combining unit 64 calculates a Z-coordinate at the reference spot 75g by using the positional information of the effective grid area G3.

Furthermore, in the above-described example, the description has been provided by exemplifying the case where the combining unit 64 calculates two kinds of partial current topographical data including the first partial current topographical data 71 and the second partial current topographical data 72, but not limited thereto. For example, the combining unit 64 may calculate three or more kinds of partial current topographical data. Additionally, the combining unit 64 may find partial current topographical data from a different kind of the current topographical data 70 or the current topographical data 70 found by a different measuring method from above.

The combining unit 64 calculates a plurality of pieces of partial current topographical data, and then generates combined current topographical data by combining data included in the respective partial current topographical data. In the case of combining the partial current topographical data, the combining unit 64 performs combination in accordance with, for example, a predetermined rule. Exemplary predetermined rule may include priority order preset per the current topographical data 70. In the case of using the priority order preset per the current topographical data 70, the combining unit 64 may be adapted to preferentially adopt a Z-coordinate at each reference spot 75 of partial current topographical data calculated from the current topographical data 70 having high priority order. This priority order is set per measuring method for the current topographical data 70, for example. For example, the current topographical data 70 found by a measuring method having low accuracy may be set to have low priority order.

FIG. 8(a) is a diagram illustrating the exemplary combined current topographical data 73. For example, the combining unit 64 generates, for each reference spot 75, the combined current topographical data 73 as illustrated in FIG. 8(a) by combining height data of the first partial current topographical data 71 and second partial current topographical data 72 in accordance with the predetermined rule. In the present embodiment, a description will be provided for a case of adopting a rule in which height data is found for each reference spot 75 based on priority order set per the current topographical data 70 as the predetermined rule, in other words, height data is extracted from either one of the partial current topographical data 71, 72. In the present embodiment, a description will be provided by exemplifying case where the first current topographical data (first partial current topographical data) 71 has higher priority order than the second current topographical data (second partial current topographical data) 72 does.

The combined current topographical data 73 extracts the height data at the reference spots 75a, 75b, 75c, 75d, 75e from the first partial current topographical data 71 under the rule that the first current topographical data (first partial current topographical data) 71 is more prioritized than the second current topographical data (second partial current topographical data) 72. In addition, the combined current topographical data 73 extracts the height data at the reference spots 75f, 75h from the second partial current topographical data 72. The reference spot 75g has no Z-coordinate data.

FIG. 8(b) illustrates Z-coordinates at the respective reference spots 75 in the combined current topographical data 73. The height data extracted from the first partial current topographical data 71 is provided for the reference spots 75a, 75b, 75c, 75d, 75e, and the height data extracted from the second partial current topographical data 72 is provided for the reference spots 75f, 75h. The height data at the reference spots 75a, 75b, 75c, 75d, 75e indicated by a dotted line is height data in the second partial current topographical data 72 not adopted because of the low priority order.

Meanwhile, the height data at the reference spot 75g may also be acquired based on positional information obtained by complementing an ineffective grid G4 in the second partial current topographical data 72 as described above. Additionally, for example, as illustrated in a reference spot 75g' in FIG. 8(b), the height data at the reference spot 75g may also be acquired from the height data at the reference spot 75f and reference spot 75h by linear interpolation.

The generation unit 65 generates the virtual design data 81 of a work site based on the combined current topographical data 73 generated in the combining unit 64. FIG. 9 is a diagram illustrating the design topographical data 80, the combined current topographical data 73 at the respective reference spots 75 illustrated in FIG. 8, and the virtual design data 81 in a correlated manner. The design topographical data 80 indicates a final target surface in a construction site. The virtual design data 81 is design data indicating an intermediate design topography in order to achieve a design topography from a current topography of the work site. The intermediate design topography is a target topography set so as to be achieved by, for example, once or several times of excavation work of the bulldozer 100. As illustrated in FIG. 9, the virtual design data 81 is a value between the combined current topographical data 73 and the design topographical data 80, and may be formed by offsetting the combined current topographical data 73 in a Z-coordinate downward direction as an example. Furthermore, the virtual design data 81 may be formed in a shape obtained by, for example, offsetting the current topography in the Z-coordinate downward direction after leveling processing. A topography of the work site can be approximated to a shape of the final design data by performing automatic control for the work unit 20 stepwisely a plurality of times based on the virtual design data 81. This plurality of times of work can gradually reduce unevenness in the topography of the work site.

FIG. 10 is a flowchart illustrating an exemplary work machine control method according to the present embodiment. In Step ST10, the acquisition unit 62 of the display controller 30 acquires a plurality of pieces of the current topographical data 70 stored in a storage unit 35. The exemplary current topographical data 70 may include: the current topographical data 70 obtained by measuring a current topography by using, for example, positional information of a vehicle; the current topographical data 70 obtained by measuring a current topography by using positional information of a work machine such as the bulldozer 100; the current topographical data 70 obtained by surveying a current topography by making a surveying vehicle travel; the current topographical data 70 obtained by surveying a current topography by using a stationary surveying instrument; the current topographical data 70 obtained by measuring a current topography by a stereo camera; and the current topographical data 70 obtained by photographing a current topography by an unmanned air vehicle such as a drone and finding a current topography as a result of photographing. Meanwhile, after Step ST10, the verification unit 63 may perform verification processing for the acquired current topographical data 70.

Next, in Step ST20, the combining unit 64 calculates, for multiple kinds of the acquired current topographical data 70, partial current topographical data that is, for example, a set of Z-coordinates of respective reference spots 75 based on positional information of grid areas G. Next, in Step ST30, the combining unit 64 generates combined current topographical data by combining data included in the respective partial current topographical data in accordance with a predetermined rule. The combining unit 64 stores the generated combined current topographical data 73 in the storage unit 35. Next, in Step ST40, the generation unit 65 generates the virtual design data 81 based on the combined current topographical data 73 stored in the storage unit 35.

Next, in Step ST50, the navigation controller 40 and the work unit controller 50 control the work unit 20 based on the generated virtual design data 81. In this case, the navigation controller 40 sets a target blade edge position of the blade edge 21p of the blade 21 based on the generated virtual design data 81, and outputs the same to the work unit controller 50 The work unit controller 50 outputs a work unit command value to control operation of the work unit 20 based on a value of the target blade edge position output from the navigation controller 40. Thus, operation of the work unit 20 is controlled based on the virtual design data 81.

As described above, the work machine control system according to the present embodiment includes: the acquisition unit 62 adapted to acquire a plurality of pieces of the current topographical data 70 indicating a current topography of a work site where the bulldozer 100 performs work; and the combining unit 64 adapted to generate the combined current topographical data 73 of the work site in accordance with a predetermined rule based on the plurality of pieces of the current topographical data 70 acquired in the acquisition unit 62. Additionally, the work machine control method according to the present embodiment includes: acquiring a plurality of pieces of the current topographical data 70 indicating a current topography of a work site where the bulldozer 100 performs work; and generating the combined current topographical data 73 of the work site in accordance with a predetermined rule based on the acquired plurality of pieces of the current topographical data 70. According to this configuration, the current topographical data of the work site can be made to remain in a wide range with high accuracy by generating the combined current topographical data 73 by using multiple kinds of the current topographical data 70. Consequently, automatic control for the work unit 20 can be accurately performed by using the combined current topographical data 73 that is highly-accurate current topographical data.

The work machine control system 200 according to the present embodiment further includes the generation unit 65 adapted to generate the virtual design data 81 of a work site based on the combined current topographical data 73 and design topographical data 80 indicating a design topography of the work site. According to this configuration, the virtual design data 81 is generated based on the combined current topographical data 73. Therefore, the work unit 20 can be controlled by using the highly-accurate virtual design data 81.

While the embodiment has been described above, note that the embodiment is not limited by the described content. Further, the components described above may include a component readily conceivable by those skilled in the art, a component substantially identical, and a component in a so-called equivalent range. Further, the components described above can be suitably combined. Furthermore, at least one of various kinds of omission, replacement, and modification can be made for the components in the scope without departing from the gist of the embodiment. For example, the respective processing executed by the navigation controller 40 may also be executed by the display controller 30, the work unit controller 50, or a controller other than these.

Furthermore, in the above embodiment, the description has been provided by exemplifying the bulldozer 100 as a work machine, but not limited thereto, a different work machine such as an excavator or a wheel loader may also be used. Additionally, the control system 200 of the above embodiment may be provided in a work machine such as the bulldozer 100, may also be provided in the management server 300 and the like, or may also be shared by a work machine and a management server.

Furthermore, in the above-described embodiment, the description has been provided by exemplifying, as the current topographical data 70, the first current topographical data obtained by measurement by using positional information of a work machine such as the bulldozer 100 and the second current topographical data obtained by measurement by using positional information of a vehicle, but not limited thereto. For example, as the current topographical data 70, it may be possible to use a surveying result by using, for example, a surveying instrument as described above, a detection result in the case of detecting a current topography by using an unmanned air vehicle such as a drone, or the like.

Additionally, in the above-described embodiment, the description has been provided by exemplifying the configuration of generating the combined current topographical data 73 based on priority order preset for the current topographical data 70 as a predetermined rule when the combining unit 64 generates the combined current topographical data 73. For example, the combining unit 64 may calculate an average value or a center value of height data (Z-coordinates) at positions (X, Y coordinates) of the first partial current topographical data 71 and the second partial current topographical data 72 and adopt a calculation result as the combined current topographical data 73. Furthermore, in this case, the combining unit 64 may also adopt, as the combined current topographical data 73, a result of performing weighted averaging for the first partial current topographical data 71 and the second partial current topographical data 72 based on a predetermined condition. Additionally, the combining unit 64 may also adopt, as the combined current topographical data 73, Z-coordinate lowest data or Z-coordinate highest data at each correspondent position (X, Y coordinate) in a plurality of pieces of partial current topographical data. Additionally, accuracy information included in GNSS radio waves, information indicating a method of measuring the current topographical data 70 (measuring method information), or time information indicating a time of measuring the current topographical data 70 may be preliminarily assigned to positional information of the current topographical data 70, and the combined current topographical data 73 may be obtained by performing prioritization or weighted averaging based on such accuracy information and measuring method information. Furthermore, for example, the measuring method information may be preliminarily assigned to each of the plurality of pieces of the current topographical data 70, and the combining unit 64 may generate the combined current topographical data 73 based on priority order or weighted averaging in accordance with a preset measuring method. Additionally, for example, priority order or quantified accuracy information may be set in accordance with each measuring method for the current topographical data 70.

Furthermore, for example, in the case of measuring the current topography by using positional information of a vehicle or the like, accuracy may be varied by accuracy and a calculation algorithm of each kind of a sensor. Therefore, the measuring method information or the accuracy information may be assigned to the current topographical data 70 in accordance with accuracy and a calculation algorithm of each kind of a sensor.

Additionally, in the above-described embodiment, the combining unit 64 generates the combined current topographical data 73 by using the partial current topographical data 71, 72, but the embodiment is not limited thereto. For example, the combining unit 64 may combine a plurality of pieces of the current topographical data 70 in accordance with a predetermined rule without using the partial current topographical data, and adopt the same as the combined current topographical data 73.

Additionally, in the above-described embodiment, the description has been provided for the case where the combining unit 64 calculates a Z-coordinate per reference spot 75 as partial current topographical data 71, 72, but not limited thereto. For example, the combining unit 64 may combine a plurality of pieces of the current topographical data 70 as they are without calculating the partial current topographical data from the current topographical data 70, and may adopt the same as the combined current topographical data 73. In other words, the combining unit 64 may generate the combined current topographical data 73 such that a position including height data in the combined current topographical data 73 is to be a position of place including positional information in a grid area G instead of each reference spot 75.

Additionally, in the above-described embodiment, the description has been provided by exemplifying the case where the combined current topographical data corresponds to a set of positional data at specific spots such as reference spots 75, but not limited thereto. For example, the combined current topographical data may be a set of positional data in part or all of regions in the work site.

REFERENCE SIGNS LIST

G Grid area
G1, G3 Effective grid area
G2, G4 Ineffective grid area
10 Vehicle body
11 Travel device
11a Crawler
12 Antenna
20 Work unit
21 Blade
21p Blade edge
30 Display controller
40 Navigation controller
50 Work unit controller
61 Current topographical data calculation unit
62 Acquisition unit
63 Verification unit
64 Combining unit
65 Generation unit
66 Display control unit
70 Current topographical data
71 First partial current topographical data
72 Second partial current topographical data
73 Combined current topographical data
75, 75a, 75b, 75c, 75d, 75e, 75f, 75g, 75h Reference spot
80 Design topographical data
81 Virtual design data
100 Bulldozer
200 Control system
300 Management server

The invention claimed is:

1. A work machine control system comprising:
   an acquisition unit implemented in a processor and configured to acquire different kinds of a plurality of current topographical data indicating a current topography of a work site where a work machine performs work by different measuring methods;
   a combining unit implemented in the processor and configured to generate combined current topographical data of the work site by adopting a high-priority current topographical data based on priority order of current topographical data set by measurement accuracy per the current topographical data acquired by the acquisition unit when there are a plurality of the current topographical data of corresponding or same position; and
   a work unit controller configured to control a work unit based on the combined current topographical data.

2. The work machine control system according to claim 1, wherein the combining unit generates the combined current topographical data of the work site based on measuring method information or accuracy information of the current topographical data acquired in the acquisition unit.

3. The work machine control system according to claim 1, wherein the combining unit generates the combined current topographical data of the work site by using priority order or a weighted average.

4. The work machine control system according to claim 1, wherein the combined current topographical data is generated based on partial current topographical data that is part of the current topographical data.

5. The work machine control system according to claim 1, wherein the combining unit generates the combined current topographical data of the work site by comparing height data in the current topographical data acquired in the acquisition unit and extracting highest or lowest height data.

6. A work machine control method comprising:
   acquiring different kinds of a plurality of current topographical data indicating a current topography of a work site where a work machine performs work by different measuring methods;
   generating combined current topographical data of the work site by adopting a high-priority current topographical data based on priority order of current topographical data set by measurement accuracy per the acquired current topographical data when there are a plurality of the current topographical data of corresponding or same position; and
   controlling a work unit based on the combined current topographical data.

* * * * *